United States Patent
Sainsard et al.

(10) Patent No.: US 10,791,667 B2
(45) Date of Patent: Oct. 6, 2020

(54) METHOD FOR TREATING SEEDS

(71) Applicants: RHODIA OPERATIONS, Paris (FR); AEGILOPS APPLICATIONS, Val de Reuil (FR)

(72) Inventors: Hubert Sainsard, Montaure (FR); Jeremy De Laat, Avignon (FR); Jean-Christophe Castaing, Sevres (FR); Benoît Abribat, Saint Fargeau Ponthierry (FR)

(73) Assignees: RHODIA OPERATIONS, Paris (FR); AEGILOPS APPLICATIONS, Val de Reuil (FR)

( * ) Notice: Subject to any disclaimer, the term of this patent is extended or adjusted under 35 U.S.C. 154(b) by 0 days.

(21) Appl. No.: 15/312,846

(22) PCT Filed: May 18, 2015

(86) PCT No.: PCT/FR2015/000101
§ 371 (c)(1),
(2) Date: Nov. 21, 2016

(87) PCT Pub. No.: WO2015/181453
PCT Pub. Date: Dec. 3, 2015

(65) Prior Publication Data
US 2017/0142893 A1    May 25, 2017

(30) Foreign Application Priority Data
May 26, 2014  (FR) ...................... 14 01196

(51) Int. Cl.
*A01C 1/06*    (2006.01)
*A01N 25/00*   (2006.01)
*A01N 25/04*   (2006.01)

(52) U.S. Cl.
CPC ............... *A01C 1/06* (2013.01); *A01N 25/00* (2013.01); *A01N 25/04* (2013.01)

(58) Field of Classification Search
CPC ........... A01C 1/06; A01N 25/00; A01N 25/04
See application file for complete search history.

(56) References Cited

U.S. PATENT DOCUMENTS

| | | | |
|---|---|---|---|
| 4,149,869 A | 4/1979 | Lloyd | |
| 4,665,648 A * | 5/1987 | Branco | A61K 9/2866 47/56 |
| 5,787,640 A * | 8/1998 | Duke | A01C 1/06 47/57.6 |

FOREIGN PATENT DOCUMENTS

| | | |
|---|---|---|
| WO | 2006131213 A1 | 12/2006 |
| WO | 2011045004 A2 | 4/2011 |

* cited by examiner

*Primary Examiner* — John Pak
*Assistant Examiner* — Andriae M Holt
(74) *Attorney, Agent, or Firm* — Vorys, Sater, Seymour and Pease LLP

(57) ABSTRACT

The present invention relates to a process for treating seeds which may be used, in particular, for coating grains.
The treatment process of the invention is a process for treating, in particular for coating, seeds, comprising at least:
 a step of dispersing, in an aqueous medium, a hydratable compound, the hydratable compound being present in the dispersion at a concentration of at least 4.5% by weight relative to the total weight of the dispersion, and
 a step of bringing the dispersion thus obtained into contact with seeds.

12 Claims, 1 Drawing Sheet

METHOD FOR TREATING SEEDS

TECHNICAL FIELD

The present document relates to a process for treating seeds. This process may be used, in particular, for coating grains.

BACKGROUND

In the field of agriculture, it is known to treat seeds to be able to handle them more easily, improve the environment in which they will grow or their germination properties, or to protect them, for example with regard to pests, mold, or from deteriorating while aging. For this purpose, various treatment processes exist, such as simple surface treatment (seed dressing), seed coating or seed pelletizing.

Seed coating generally consists of depositing, on the surface of the seeds, a thin polymer coating in which various agrochemical substances are included. The shape and the dimension of the seeds over this process are only slightly modified.

Pelletizing generally consists of modifying the size and the shape of the seeds by supplying a large amount of inert material, for example to facilitate the use of conventional mechanical seeders which are not easily used with seeds which are too small. Several phytosanitary substances may thus be located more specifically in the various strata of the pellet.

Conventionally, the treatment formulations used (in particular during seed coating) are composed of:
liquid formulations typically comprising a fungicide dispersed in water, pigments and binding polymers or "binders", and
powder formulations, making it possible to accelerate drying, reduce adhesiveness and improve flowability of the grains.

Typically, the liquid formulations are applied to the seeds by processes such as spraying, spraying-drying, blending, churning or any other means well known to those skilled in the art.

In the case of the powder formulations, the formulation is adhered to the seeds by adding water.

More specifically, the most commonly employed method consists in premixing the powder and the water so as to obtain a dispersion which is itself applied to the seeds. Alternatively, the following can be carried out: either the seeds are wetted and the powder is then added to the seeds, or the powder is mixed with the seeds and the water is then added.

Some treatment compounds, however, remain difficult to apply to the seeds. This is especially the case with hydratable compounds which develop high viscosity on contact with water and which it is desired to use in a large proportion. Typically, on large crop seeds, the targeted proportion is between 0.1% and 1%, this proportion corresponding to the weight of the dry treatment, after elimination of water, over the weight of seed.

In the case of a liquid formulation, these hydratable compounds give rise to too high a viscosity to be able to handle and apply the formulation under standard conditions. The option consisting in diluting the formulation (to reduce the concentration of the compound and hence limit the viscosity of the formulation) is moreover not satisfactory. This is because this option would lead to the introduction of a large amount of water relative to the weight of the treated seeds. Now, the amount of water is limited by a maximum value acceptable by the seeds (in the absence of drying, which is the rule for large crop seeds). Beyond this acceptable threshold, the seed may spontaneously germinate on storage or else quickly lose its germination capability after some time in storage, or the water may cause swelling of the grain, which only regains its initial shape very slowly, these variations in volume possibly leading to crumbling, or even cracking of the seed pelletizing or seed coating film, or else causing agglomerates of coated seeds. The option consisting in diluting the formulation would therefore only be satisfactory if the seeds were sewn just after the treatment, which is not envisageable for large crop seeds due to the fact that these seeds represent large volumes.

In the case of a powder formulation, it has been possible to observe that the abovementioned hydratable compounds would cause problems of inhomogeneous treatment of the seeds, and residues in turn causing problems of loss of material and fouling of the mixing apparatus.

There is therefore a need for a novel treatment process making it possible to apply hydratable compounds to seeds in large proportions.

There is also a need for a treatment process which is easy to employ on an industrial scale and at a reasonable cost.

GENERAL PRESENTATION

The present document relates to a process for treating seeds. In the present application, "seed" is intended to mean any organ or fragment of a plant which is placed in a growth medium (generally earth) in order to enable the formation of another plant of the same nature. It may especially be a grain. A seed may be formed from such an organ or fragment of a plant agglomerated with other substances or several organs or fragments agglomerated with one another. In addition, the seed to which the treatment process is applied may have been subjected to another treatment beforehand. In particular, this seed may have already been treated and, for example, be covered with one or more coating layers. Conversely, this seed may be in the natural state.

Such a process comprises, at least:
a step of dispersing, in an aqueous medium, a hydratable compound, said hydratable compound being present in the dispersion at a concentration of at least 4.5% by weight relative to the weight of the dispersion, and
a step of bringing the dispersion thus obtained into contact with seeds.

"Aqueous medium" is intended to denote a medium comprising water as solvent.

"Dispersion" is intended to denote a heterogeneous system in which a finely divided material, here the hydratable compound, is distributed in another material, here the aqueous medium. In the present case, to obtain a uniform distribution of the hydratable compound in the aqueous medium, it is possible to use an agitating device. For example, it may be a dissolver disk, a four blade mixer impeller, a rotor-stator type homogenizer, or any other suitable type of homogenizer, mixer or agitator.

"Hydratable compound" is intended to denote a compound, for example a polymer, which, when it is dispersed in distilled water at 25° C., with agitation for 2 hours, at a concentration which may extend up to 5% by weight relative to the total weight of the dispersion, leads in less than 48 h with mild agitation, by hydration, to a formulation having a viscosity (measured at 25° C. on a Rheomat RM300 at a shear rate of 10 s$^{-1}$) of greater than 8000 cP. In this sense, the formulations for which no viscosity measurement is possible (for example in the case of totally gelled formulations) are considered to have a viscosity (measured at 25° C. on a Rheomat RM300 at a shear rate of 10 s$^{-1}$) of greater than 8000 cP.

For this measurement, the pH value of the dispersion may be adjusted in order to improve the hydration conditions of the hydratable compound. The pH value may thus typically vary from 3 to 12, especially from 5 to 10, as a function of the hydratable compound in question, the suitable pH ranges for each type of hydratable compound being known to those skilled in the art.

The hydratable compound may be present in the dispersion at a maximum concentration of 70% by weight relative to the weight of the dispersion. This concentration may advantageously be between 4.5 and 70% by weight, for example between 5 and 65% by weight, or even between 7.5 and 65%, especially between 10 and 60% by weight.

According to one embodiment, this step of bringing into contact is carried out before the viscosity of the dispersion (measured at 25° C. on a Rheomat RM300 at a shear rate of 10 s$^{-1}$) reaches a maximum value. This maximum value may be greater than or equal to 10 000 cP (centipoise), i.e. 10 000 mPa·s. (millipascal·seconds), especially greater than or equal to 50 000 cP, i.e. 50 000 mPa·s. The step of bringing into contact may therefore be carried out before the viscosity of the dispersion (measured at 25° C. on a Rheomat RM300 at a shear rate of 10 s$^{-1}$) reaches a maximum value of 50 000 mPa·s.

Alternatively or additionally, as the viscosity of the dispersion increases rapidly over time, the step of bringing the dispersion into contact with the seeds is carried out at the latest 180 s (seconds), for example at the latest 120 s, preferably at the latest 60 s, advantageously at the latest 30 s after the hydratable compound has been brought into contact with the aqueous medium.

When the process of the invention is integrated into a seed treatment line requiring a throughput with a shorter duration than the aforementioned throughput, the use of several devices in parallel making it possible to carry out the process of the invention in a sequential manner may make it possible to adapt to the required throughput. The invention of course extends to these embodiments.

For example, if the throughput required by the seed treatment line is 30 s and the step according to the invention of bringing the dispersion into contact with the seeds has to be carried out approximately 180 s after the hydratable compound has been brought into contact with the aqueous medium, then employing 6 devices in parallel, each enabling the process of the invention to be carried out, and operating them in sequence, makes it possible to achieve a throughput of 30 s.

By way of illustration, the hydratable compound may especially be chosen from the following compounds: a cellulose or a derivative thereof, for example hydroxycellulose, alkylcellulose, such as methylcellulose, hydroxyalkylcellulose, such as hydroxyethylcellulose, hydroxypropylcellulose or hydroxypropylmethylcellulose, carboxyalkylcellulose, such as carboxymethylhydroxyethylcellulose, sodium carboxymethylcellulose, synthetic polymers such as polyvinylpyridine, polyvinylpyrrolidone, polyehylene glycol, polyethylene oxide, polyamide, polyacrylamide, polymethacrylic acid, polyvinyl alcohol, polyglycerol, polytetrahydrofuran, polyacrylic acid, polyacrylate, alginic acid and derivatives thereof, such as alginate, pectin, galactomannans and derivatives thereof, such as guar gum, hydroxypropyl guar gum, carboxymethyl guar, carboxymethylhydroxypropyl guar, cationic guars, gelatine, starch and derivatives thereof, such as cationic starch, corn starch, wheat starch, rice starch, potato starch, tapioca, waxy corn, sorghum, waxy sorghum, dextrin, chitin, chitosan, xanthan gum, carageenan gum, gum karaya, a derivative of any one of the abovementioned compounds, or a combination of these compounds.

According to another embodiment, the hydratable compound is chosen from celluloses and derivatives thereof.

According to another embodiment, the hydratable compound is chosen from galactomannans and derivatives thereof.

According to another embodiment, the hydratable compound is chosen from polyacrylamides and derivatives thereof.

According to another embodiment, the hydratable compound is chosen from starch and derivatives thereof.

According to another embodiment, the hydratable compound is chosen from xanthan gum and derivatives thereof.

It will be noted that the dispersion may comprise compounds other than the hydratable compound, such as, for example, pesticides, fungicides, herbicides, molluscicides, bactericides, bacteriostatic agents, repellant products, nutrients, fertilizers, growth stabilizers, latices (for example chosen from polymers of vinyl acetate, polyurethane, styrene/butadiene or acrylic type, optionally in the form of core-shell structures), surfactants, antioxidants, plasticizers, dyes, fillers (for example a flowability powder (or siccative powder) of silica type (especially precipitated or fumed silicas), kaolin or talc), biological additives (for example bacterial or fungal (especially mycorrhizal) inoculants) or a mixture thereof. These additional compounds may be added in amounts conventionally used by those skilled in the art. By way of example, the latices may typically be introduced at contents ranging from 2 to 60 g (by solids extract), especially from 3 to 30 g (by solids extract) per quintal of seed to be treated.

The proposed process makes it possible to obtain a good distribution of the dispersion on the seeds. This method may be used for seed coating and especially for grain coating.

When the dispersion covers a seed, it has a positive influence on the growth of this seed. It appears that the dispersion makes it possible to keep the seed which it covers in a moist environment, which is favorable for the growth of the seed. This positive influence is however only observed if the concentration of hydratable compound in the dispersion is quite high, and in particular exceeds the abovementioned minimum concentration.

A high concentration of hydratable compound however has the drawback of increasing the viscosity of the dispersion. In practice, after adding the hydratable compound to the aqueous medium, the viscosity of the dispersion increases very rapidly. Bringing the hydratable compound and the seeds into contact before the viscosity of the dispersion has reached the abovementioned maximum value and/or within a certain amount of time makes it possible to limit, or even prevent, the formation of aggregates. Such aggregates are undesirable since the amount of dispersion agglutinated in aggregates cannot be used for treating seeds and constitutes a loss. Conversely, if there are little or no aggregates, a more homogeneous treatment is obtained: the dispersion is better distributed on the seeds and each seed is better covered by the dispersion. By limiting or preventing the formation of aggregates, the risk of fouling of the machinery used is also reduced, and especially the risk of fouling of the mixing bowl in which the dispersion is mixed with the seeds.

According to one embodiment, the weight of dispersion brought into contact with the seeds may be between 0.5 and 10% of the weight of the seeds.

In some embodiments, the weight of dispersion brought into contact with the seeds is greater than or equal to 0.5% of the weight of the seeds. Below this minimum value of 0.5%, the amount of dispersion per seed, and hence the effect of the dispersion on the seeds, may not be sufficient. Typically, the weight of dispersion brought into contact with the seeds may be greater than or equal to 0.75% of the weight of the seeds, especially greater than or equal to 1% of the weight of the seeds.

Moreover, the weight of dispersion brought into contact with the seeds is typically less than or equal to 10% of the weight of the seeds, especially less than or equal to 8%, in particular less than or equal to 6%. Above this maximum value, a saturation effect may be observed. In other words, the excess weight of dispersion has no effect or little effect and constitutes a loss. In addition, above a ratio of 10% between the weight of the dispersion and the weight of seed, especially above 8%, in particular above 6%, there is a risk of the amount of water in the aqueous dispersion exceeding the acceptable threshold for the seed. Above this acceptable threshold, the seed may spontaneously germinate on storage or else quickly lose its germination capability after some time in storage.

Advantageously, carrying out the treatment process of the invention does not cause excessive hydration of the seeds. In addition, carrying out the treatment process of the invention does not modify the germination ability of the seeds.

The minimum and maximum weight ratios between the weight of the dispersion and the weight of seed may vary between the abovementioned ranges as a function, on the one hand, of the nature of the seed, and, on the other hand, of the nature of the hydratable compound.

Aside from the characteristics which have just been mentioned above, the proposed process may have one or more of the following characteristics, considered individually or according to technically feasible combinations:
When it is placed in contact with the seeds, the hydratable compound must already be at least partially hydrated. This partial hydration makes it possible to improve the adhesive capability thereof to the seed. Advantageously, the process of the invention does not require the introduction of additional adhesive solutions to ensure the adhesion of the hydratable compound to the seed.
As indicated above, the concentration of the hydratable compound is between 4.5 and 70% by weight, in particular between 5 and 65% by weight, relative to the weight of the dispersion. This concentration may especially be between 10 and 45% by weight, in particular between 15 and 35% by weight. These concentration ranges make it possible to obtain a good compromise, for most hydratable compounds, between the observed kinetics of viscosity increase and the amount of compound and water in the dispersion.
Optionally, a step of drying may be carried out at the end of the process of the invention, to reduce the amount of water supplied by the dispersion. This drying may for example be carried out by heating at a moderate temperature, for example from 20 to 40° C., for a few minutes to a few hours, so that the resulting gain in humidity by the seeds of the process of the invention does not exceed approximately 3% by weight, preferably approximately 2% by weight.
Advantageously, the process of the invention does not comprise an additional drying step.

The process for treating seeds proposed also has the advantage of being able to be utilized on an industrial scale, that is to say to be carried out to treat large amounts of seeds, at high treatment throughputs. For example, the seeds may be treated by batches of 10 kg, and a cycle for treating a batch in the seed coating apparatus may last less than 1 min. In addition, the process proposed may be integrated into a seed treatment line. In other words, this process may be carried out on seeds before or after other steps for treating these seeds.

The invention also relates to the treated seeds, in particular the coated seeds, obtained according to the process described above.

The abovementioned characteristics and advantages, as well as others, will become apparent on reading the following detailed description of exemplary embodiment(s) of the proposed process.

DETAILED DESCRIPTION OF EXAMPLE(S)

An exemplary embodiment is described in detail below. This example illustrates the characteristics and advantages of the invention. Nonetheless, it is recalled that the invention is not limited to this example.

Tests, targeting applying, to soy grains, a hydratable compound within the meaning of the invention, namely an agropolymer of natural origin, sold under the brand AgRHO GSB 30 by SOLVAY, were carried out. These tests are described below.

The process according to the invention (test A) is compared with two alternative processes using the hydratable compound in powder form, to avoid too high a viscosity developing before application to the seed.
More specifically:
  the alternative process illustrated in test B consists in applying the powder of the hydratable compound to grains which were wetted beforehand to promote the adhesion thereof.
  the alternative process illustrated in test C consists in pre-mixing the seeds and the powder of the hydratable compound, then in applying water to promote the adhesion thereof.

In all these examples, the target dosage of hydratable compound relative to the weight of the grains is 200 g/quintal.

Moreover, an upper limit of 800 g of water/quintal of seeds is imposed, in order to avoid any premature aging of the seed batch on storage.

The first test or test A (in accordance with the invention) consisted in carrying out the following operations in the order given:
1. 100 grams of soy grains are loaded into a laboratory seed treatment machine (NoroGard R150 model).
2. 0.50 gram of AgRHO GSB 30 is mixed with 2.0 grams of demineralized water for 1 minute.
3. 1 gram of the mixture obtained in step 2) is injected into the seed treatment machine 10 seconds after setting the seeds in rotation.
4. The rotation of the seeds is stopped after 35 seconds.

5. The seeds are unloaded.

The second test, denoted test B (comparative), consisted in carrying out the following operations in the order given:
1. 100 grams of soy grains are loaded into a laboratory seed treatment machine (NoroGard R150 model).
2. 0.8 g of deionized water is injected into the seed treatment machine 5 seconds after setting the seeds in rotation.
3. 0.20 g of AgRHO GSB 30 is introduced into the seed treatment machine in powder form 10 seconds after setting the seeds in rotation.
4. The rotation of the seeds is stopped after 35 seconds.
5. The seeds are unloaded.

The third test, denoted test C (comparative), consisted in carrying out the following operations in the order given:
1. 100 grams of soy grains are loaded into a laboratory seed treatment machine (NoroGard R150 model).
2. 0.20 g of AgRHO GSB 30 is introduced into the seed treatment machine in powder form 10 seconds before setting the seeds in rotation.
3. 0.8 g of deionized water is injected into the seed treatment machine 10 seconds after setting the seeds in rotation.
4. The rotation of the seeds is stopped after 35 seconds.
5. The seeds are unloaded.

Figure 1:
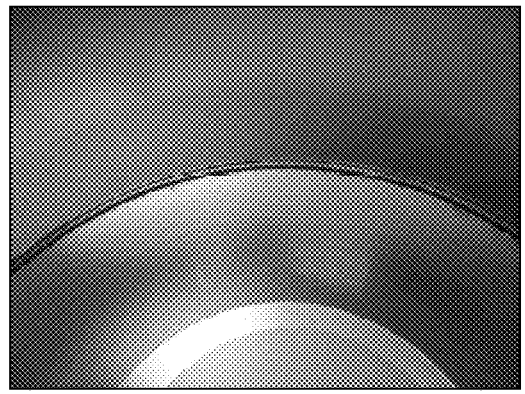
FIG. 1 is a part of a mixing bowl at the joint between the bottom and the side wall of the bowl without powder residue.
Figure 2:
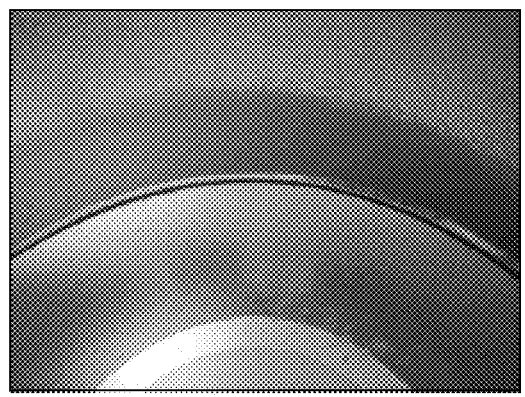
FIG. 2 is a part of a mixing bowl at the joint between the bottom and the side wall of the bowl with powder residue.
Figure 3:
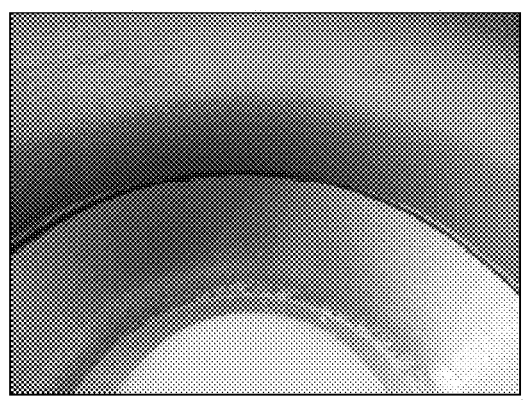
FIG. 3 is a part of a mixing bowl at the joint between the bottom and the side wall of the bowl with powder residue.

The photos of appended FIGS. 1 to 3 were taken after the final step of tests A to C, respectively. These three photos all show a part of a mixing bowl, located at the join between the bottom and the side wall of this bowl.

As can be seen on the photo of FIG. 2, corresponding to test B, a large amount of powder has remained adhered to the side wall of the bowl, and a (lesser) amount of powder has remained adhered to the bottom of the mixing bowl. On the photo of FIG. 3, corresponding to test C, it can be seen that a certain amount of powder has remained adhered to the bottom of the mixing bowl. These levels of residues and deposits are unacceptable from the perspective of repeated batch treatment on an industrial scale.

In contrast to the photos of FIGS. 2 and 3, the photo of FIG. 1 shows that at the end of test A, the side wall and the bottom of the bowl are clean, i.e. without powder residues.

These tests illustrate the advantages of the process of the invention, exemplified by test A, compared to comparative tests B and C. In particular, it is observed that the process of the invention makes it possible to limit material losses and to reduce the risk of fouling of the mixing bowl. On an industrial scale, the latter aspect is all the more important since several batches of grains must be treated in succession, at a high throughput which precludes being able to clean the mixing apparatus between two batches. The embodiments or exemplary embodiments described in the present description are given by way of nonlimiting illustration, those skilled in the art being easily able to, in light of this description, modify these embodiments or exemplary embodiments, or envisage others, while remaining within the scope of the invention.

Moreover, the various characteristics of these embodiments or exemplary embodiments may be used alone or be combined with one another. When they are combined, these characteristics may be combined as described above or differently, the invention not being limited to the specific combinations described in the present description. In particular, unless specified otherwise, a characteristic described in relation to an embodiment or exemplary embodiment may be applied analogously to another embodiment or exemplary embodiment.

The invention claimed is:

1. A process for treating seeds comprising at least:
   a) dispersing a hydratable compound in an aqueous medium to form a dispersion, the hydratable compound being present in the dispersion at a concentration of between 10% and 35% by weight relative to the total weight of the dispersion; and
   b) bringing the dispersion into contact with the seeds before the dispersion reaches a maximum viscosity value of 10,000 mPa·s, wherein the step of bringing the dispersion into contact with the seeds is carried out at the latest 180 seconds after the hydratable compound has been brought into contact with the aqueous medium,
   wherein the hydratable compound is a guar gum or a derivative thereof,
   the dispersion does not contain another adhesive or binder except said guar gum or derivative thereof, and
   the total weight of the dispersion brought into contact with the seeds is between 0.5% and 10% of the weight of the seeds.

2. The process as claimed in claim 1, wherein the step of bringing the dispersion into contact with the seeds is carried out at the latest 60 s after the hydratable compound has been brought into contact with the aqueous medium.

3. The process as claimed in claim 1, wherein the hydratable compound is hydroxypropyl guar gum or derivative thereof, in which the concentration of the hydratable compound is between 20 and 35% by weight relative to the total weight of the dispersion.

4. The process as claimed in claim 1, wherein the treating process is for coating seeds.

5. The process as claimed in claim 1, wherein the hydratable compound is between 15 and 20% by weight relative to the total weight of the dispersion.

6. The process as claimed in claim 3, wherein the hydratable compound is 20% by weight relative to the total weight of the dispersion.

7. The process as claimed in claim 1, wherein the dispersion has a pH value from 3 to 12.

8. The process as claimed in claim 1, further comprising drying the seeds contacted with the dispersion.

9. The process as claimed in claim 8, wherein the drying is performed such that the seeds contacted with the dispersion have a weight gain in humidity that is less than or equal to 3% by weight.

10. The process as claimed in claim 8, wherein the drying is performed such that the seeds contacted with the dispersion have a weight gain in humidity of about 3% by weight.

11. The process as claimed in claim 1, wherein the dispersion further comprises a lattice compound ranging from 2 to 60 grams by solids extract per quintal of the seeds.

12. A treated seed obtained according to the process of claim 1.

* * * * *